United States Patent
Gerrand et al.

(10) Patent No.: US 6,810,769 B1
(45) Date of Patent: Nov. 2, 2004

(54) MOTOR VEHICLE WIPER GEAR MOTOR WITH BASE AND CORE

(75) Inventors: Dominique Gerrand, Thure (FR); Pascal Renoux, Chatellerault (FR)

(73) Assignee: Valeo Systemes d'Essuyage (FR)

( * ) Notice: Subject to any disclaimer, the term of this patent is extended or adjusted under 35 U.S.C. 154(b) by 0 days.

(21) Appl. No.: 09/889,079

(22) PCT Filed: Jan. 11, 2000

(86) PCT No.: PCT/FR00/00045

§ 371 (c)(1),
(2), (4) Date: Jul. 11, 2001

(87) PCT Pub. No.: WO00/41921

PCT Pub. Date: Jul. 20, 2000

(30) Foreign Application Priority Data

Jan. 11, 1999 (FR) .............................................. 99 00185

(51) Int. Cl.[7] .............................................. F16H 57/00
(52) U.S. Cl. .................................................. 74/606 R
(58) Field of Search ........................ 74/606 R; 277/602, 277/608, 609, 616, 628, 637

(56) References Cited

U.S. PATENT DOCUMENTS

| | | | | |
|---|---|---|---|---|
| 3,182,120 A | * | 5/1965 | Duhn ........................ | 174/151 |
| 3,620,323 A | * | 11/1971 | Maeda et al. ............. | 180/65 A |
| 4,049,856 A | * | 9/1977 | Adams ....................... | 277/592 |
| 4,577,824 A | * | 3/1986 | Druffel et al. ............. | 248/248 |
| 4,630,888 A | * | 12/1986 | Dubar ...................... | 350/96.23 |
| 4,691,928 A | | 9/1987 | Abele ...................... | 277/235 B |
| 4,713,568 A | | 12/1987 | Adam et al. .............. | 310/112 |
| 4,831,211 A | * | 5/1989 | McPherson et al. ...... | 174/35 R |
| 4,885,948 A | * | 12/1989 | Thrasher et al. ............ | 310/83 |
| 4,892,320 A | * | 1/1990 | Tuckmantel ................ | 251/214 |
| 5,004,090 A | * | 4/1991 | Kuribara et al. ........... | 192/112 |
| 5,004,249 A | * | 4/1991 | Grosch et al. ............. | 277/601 |
| 5,015,897 A | * | 5/1991 | Inagaki et al. ............. | 310/239 |
| 5,043,534 A | * | 8/1991 | Mahulikart et al. ........ | 174/52.4 |
| 5,074,613 A | * | 12/1991 | Unterborn et al. ....... | 15/250.31 |
| 5,094,468 A | * | 3/1992 | Hieble ........................ | 277/591 |
| 5,364,109 A | * | 11/1994 | Sihon ........................ | 277/592 |
| 5,368,316 A | * | 11/1994 | Miyaoh ...................... | 277/591 |
| 5,433,038 A | * | 7/1995 | Dupuy ........................ | 49/377 |
| 5,544,901 A | * | 8/1996 | Kubouchi et al. .......... | 277/591 |
| 5,548,929 A | * | 8/1996 | Larsen et al. ................. | 24/297 |
| 5,600,419 A | * | 2/1997 | Sakuraba et al. ........... | 399/285 |
| 5,727,791 A | * | 3/1998 | Weiss et al. ................ | 277/592 |
| 5,770,907 A | * | 6/1998 | Danish et al. ................ | 310/43 |
| 5,833,441 A | * | 11/1998 | Danish et al. ............. | 277/382 |
| 5,875,681 A | * | 3/1999 | Gerrand et al. .............. | 310/83 |
| 6,047,685 A | * | 4/2000 | Schelhas et al. ............ | 123/510 |
| 6,073,936 A | * | 6/2000 | Kirchmann et al. ........ | 277/640 |

FOREIGN PATENT DOCUMENTS

| | | | |
|---|---|---|---|
| DE | 42 31 434 A1 | * 3/1994 | |
| DE | 198 47 335 A1 | * 4/2000 | |
| FR | 2691024 | 11/1993 | ............ H02K/5/22 |
| FR | 2748436 | 11/1997 | ............ B60S/1/08 |
| GB | 1462153 | 1/1977 | ............ H02K/5/14 |

* cited by examiner

Primary Examiner—David A. Bucci
Assistant Examiner—Julie K. Smith
(74) Attorney, Agent, or Firm—J. Gordon Lewis

(57) ABSTRACT

A motor vehicle wiper gear motor includes a motor core and a reduction gear base, the core and the base having metal parts. The gear motor has a joint interposed between the core and the base, the joint including a sealing material and at least a metal element in contact with the metal parts of the core and the base.

12 Claims, 3 Drawing Sheets

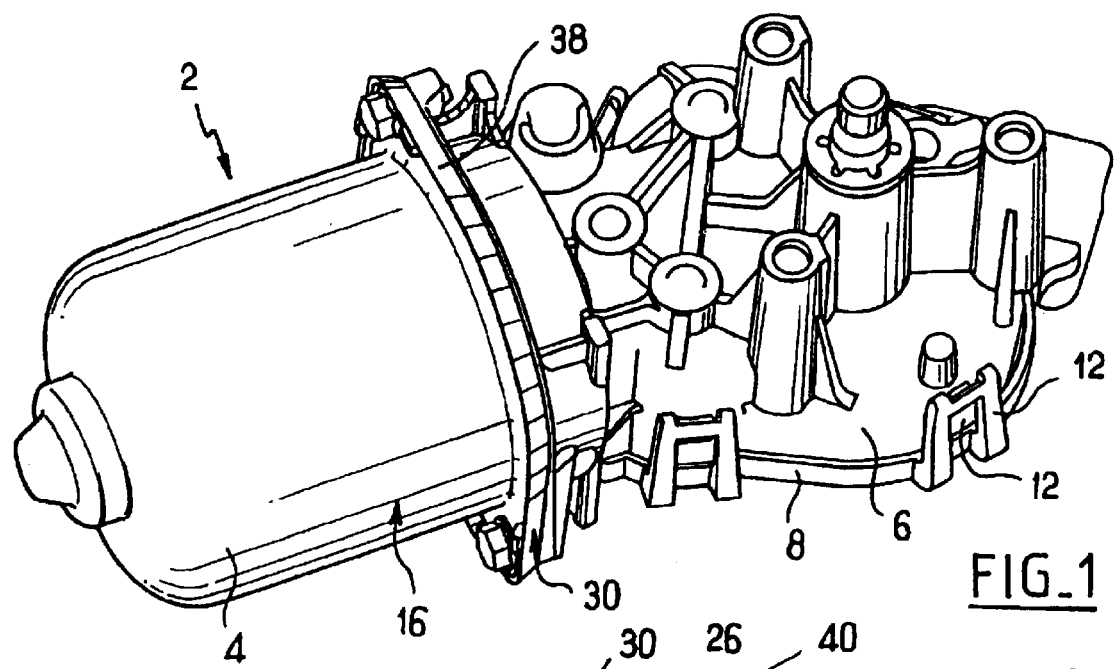
FIG_1
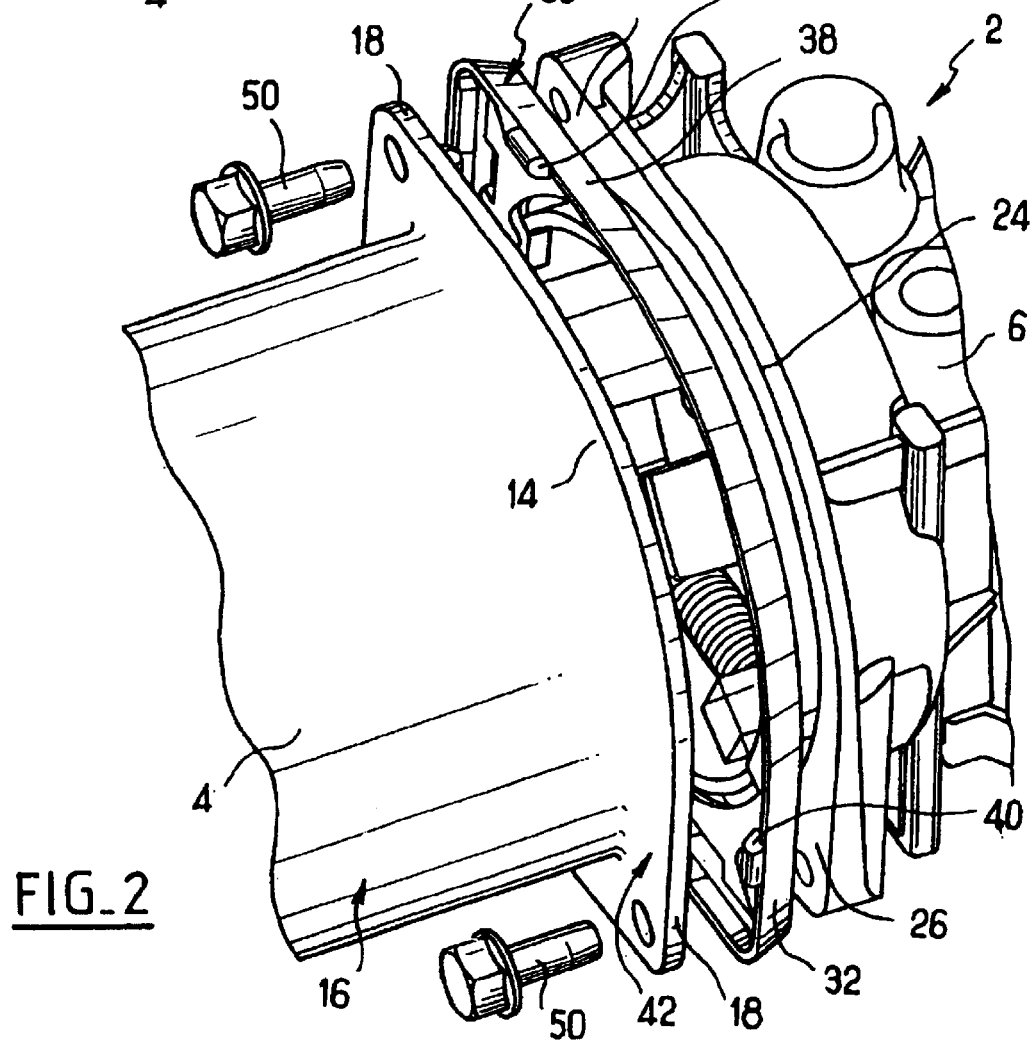
FIG_2

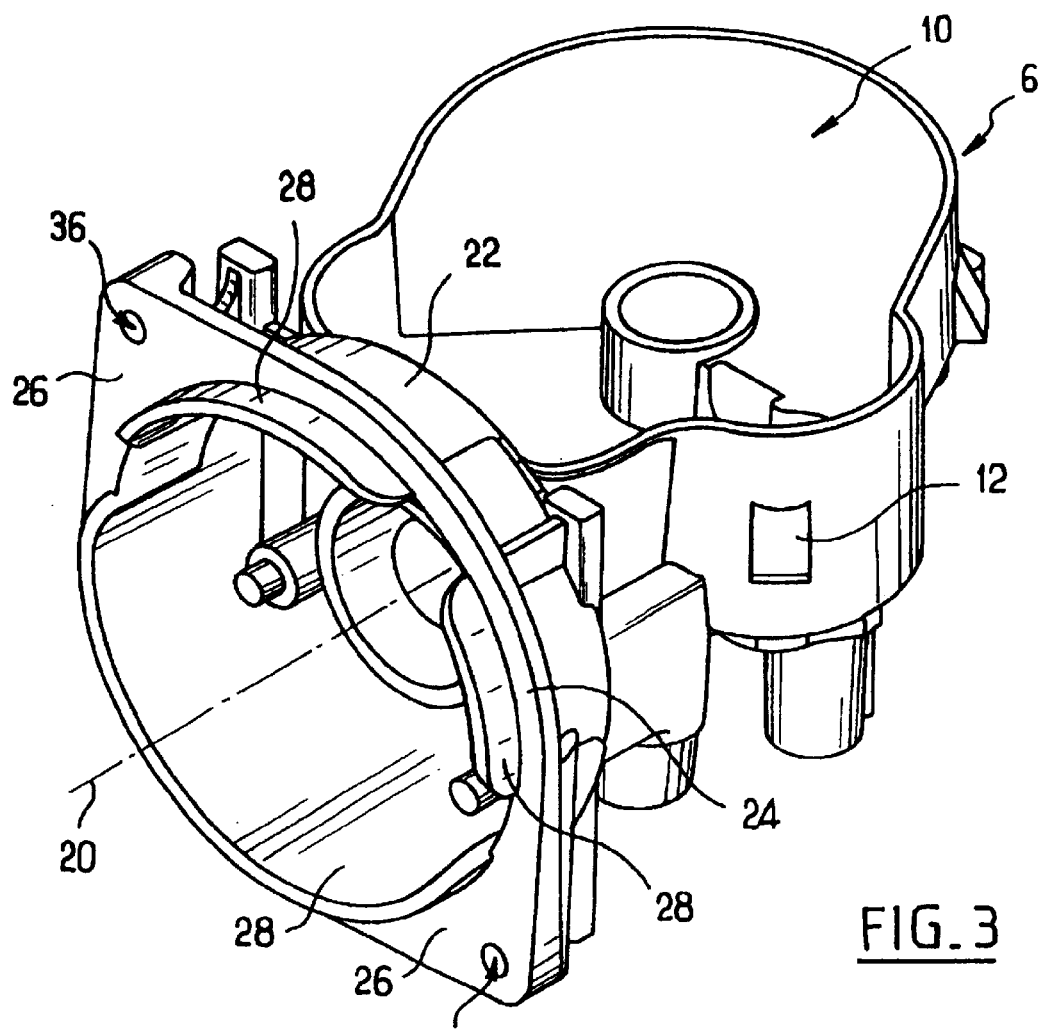
FIG_3
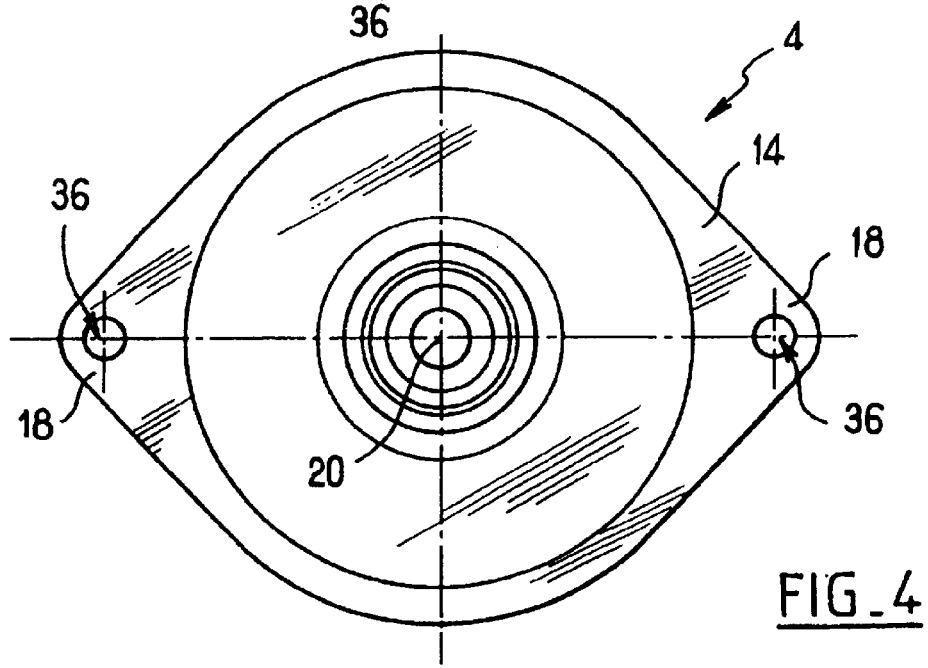
FIG_4

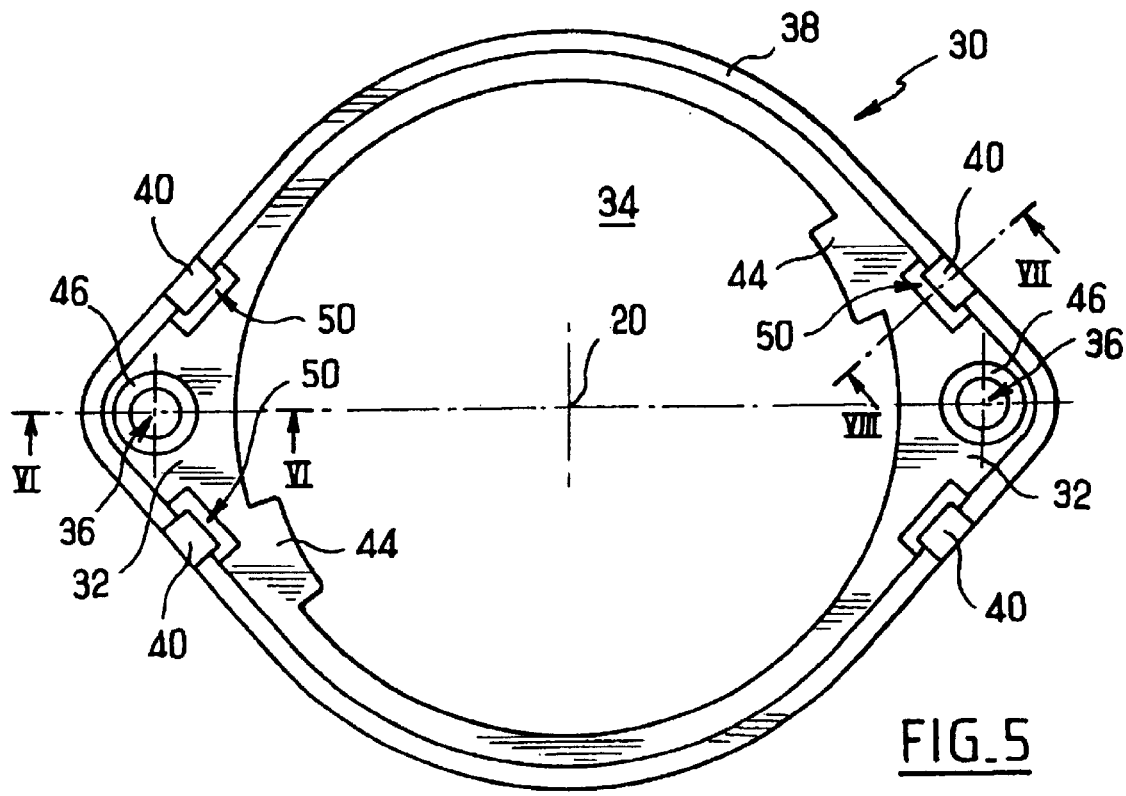
FIG_5
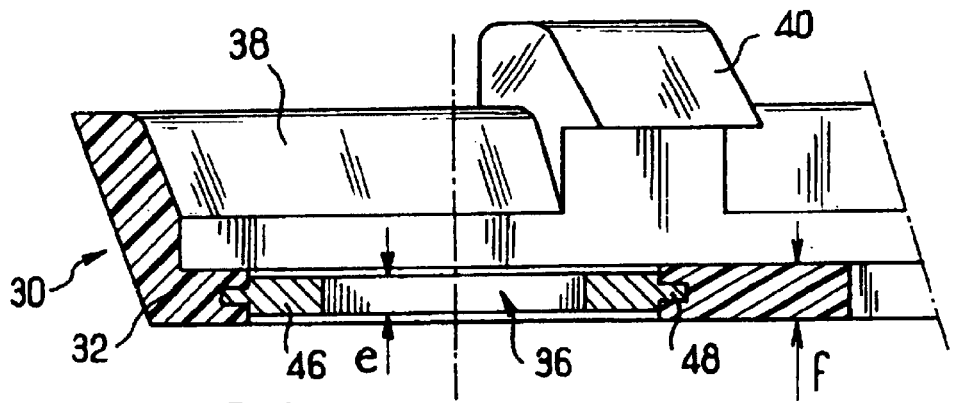
FIG_6
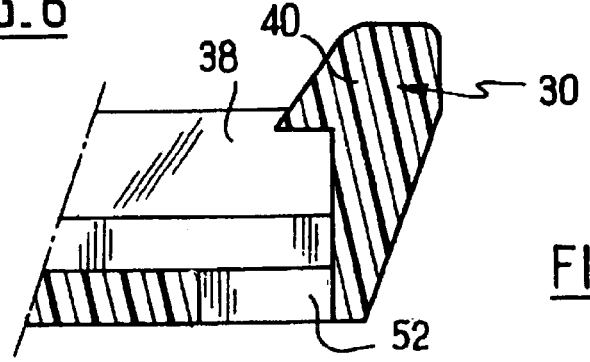
FIG_7

MOTOR VEHICLE WIPER GEAR MOTOR WITH BASE AND CORE

BACKGROUND

This invention concerns wiping motor vehicle gear motors

One knows of such gear motors containing a motor equipped with a core and a reduction gear base equipped with a base rigidly fixed to the core.

A goal of the invention is to furnish a gear motor at once less noisy, in which there exists an electric current between the base and the core allowing a precise positioning of these two elements.

SUMMARY

In order to realize this goal, one conceives of, according to the invention, a motor vehicle wiper motor including a motor core and a reduction gear base, the core and base having metal parts. The gear motor comprises a joint interposed between the core and the base, the joint comprising a sealing metal and at least a metal element in contact with the metal parts of the core and the base.

Thus, the sealing material reduces the noise. In addition, the metal element of the joint acts as a straight stop for a relatively precise positioning of the core and the base. In addition, it assures an electric current between these two components, for example, for a uniform mass potential in the entire gear case of the reduction gear motor.

Advantageously, the gear motor has a fixing orifice contiguous to the metal element.

Advantageously, the metal element is imbedded in the sealing material.

Advantageously, the metal elements are at least two and are disjointed.

Advantageously, the gear motor comprises definitive fixing from the joint to the gear motor and, in addition, the tentative fixing of the joint to either of the core of the base.

Thus, the joint is tentatively fixed to one of the pieces by waiting for the piercing of the other piece. One thus facilitates the management of the chain assembly by reducing the number of separate pieces.

Advantageously, the tentative fixing means comprises, specifically on the joint, at least a clipsage lug.

Advantageously, the gear motor has an access orifice in the lug in order to remove the temporary fixing means.

Advantageously, the gear motor contains the fixing means of the gear motor joint and, in addition, the abutment means for the angular position in relation to the gear motor around an axis of the gear motor.

Thus, one makes the positioning of the joint easier in relation to the gear motor before the fixing via the definitive fixing means. This assures, for example, the alignment of the holes of the screw.

Advantageously, one of either the core or the base has at least a cylindrical sector, the joint having an opening able to receive the cylindrical sector projecting in the opening.

Advantageously, the joint material comprises a plastic material.

One also creates, according to the invention, a procedure consisting of the following steps:

fixing the joint to one of the core and the base due to the temporary fixing means;

bringing the other of the core or the base onto the joint; and fixing between them the joint, the core and the base due to the definitive fixing means.

BRIEF DESCRIPTION OF THE DRAWING

The other characteristics and advantages of the invention will also appear more clearly in the following description of a preferred method of production given in a non-limiting example. In the attached drawings:

FIG. 1 is a perspective view of a gear motor according to a preferred method of production of the invention;

FIG. 2 is a partial spread view in perspective of the gear motor of FIG. 1;

FIG. 3 is a perspective view of the base of FIG. 1;

FIG. 4 is a view of the end of the core of FIG. 1;

FIG. 5 is an elevation view of the joint of FIG. 1;

FIGS. 6 and 7 are detailed views of the joint of FIG. 5 cut according to the planes VI—VI and VII—VII.

DETAILED DESCRIPTION

Illustrated in FIGS. 1 and 2, is a motor vehicle wiper gear motor 2. The gear motor 2 comprises a motor having a core and a reduction gear base having a base 6 and a closing plate 8 blocking an opening 10 of the base, visible in FIG. 3, and fixed to the base via clipsage means, i.e., tabs and lugs 12. The core 4, the base 6, and the closing plate 8 make up a closed crank case for the gear motor 2. Here, the core 4 and the base 6 are in metal, the closing plate 8 being a plastic material. In a known manner, the core 4 encloses a stator and a rotor, a shaft of which penetrates into the gear motor 2 in order to, after reduction, transmit a rotational movement to an exit shaft designed to guide a wiper blade.

In reference to FIGS. 1, 2 and 4, the core 4 has a generally cylindrical form blocked at an axial end and open at another axial end. This latter axial end has an annular flat edge 16 of the core 4 and has two lugs or tabs 18 diametrically opposite from each other on both sides of an axis 20 of the core 4.

In reference FIGS. 1 to 3, the base 6 has a cylindrical part 22 having an open axial end having an edge 24 that is notably identical to that of the core 4 and equipped with two tabs 26. The base 6 three cylindrical sectors 28 extending the wall 22 of the base 6 following its axis and projecting from the edge 24. These sectors 28 are disjointed and spaced such that they are arranged with three free spaces.

In reference notably to FIGS. 5 to 7, the gear motor 2 also comprises a joint 30 generally plate-like and generally having the shape of the edges 14 and 24, that is to say, a diamond-shaped form of which the closest corners are rounded or of a circular shape with two lugs 32 diametrically opposite in relation to an axis 20 of the joint. The joint has at its center a circular opening 34.

The joint 30 is able to be interposed following the axial direction between the edge 14 of the core and the edge 24 of the base 6, coaxially to the Age of the base 6. Each lug 32 of the joint is interposed between a lug 18 of the core and a tab 26 of the base 6. The six tabs 26 have orifices 36 able to be in mutual coincidence in this position. The wall of the joint 30 is in contact and is a surface support on each of the two flat faces with respectively the face of the edge 14 of the core 4, and the face of the edge 24 of the base 6.

The joint 30 has a peripheral edge 38 projecting from the wail, in the space of the side of the wall designed to be turned towards the core 4. While the gear motor 2 is mounted, this flange 38 covers the edge of the edge 14 of the core 4. The flange 38 has a shape flared towards the exterior. The flange 38 carries hooks or lugs 40 projecting from the flange 38 while simultaneously following the axial direction and radial direction towards the interior. These lugs 40, here there are four, reach to the junction of the tabs 32 with the circular zones of the joint. Thanks to the relative elasticity of the plastic material that forms the lugs 40, the lugs 40 are able to push against the rear face 42 of the edge 14 of the core 4 in order to temporarily fit the joint 30 to the core 4 via clipping.

The joint 30 comprises angular sections in relief or stops 44, here there are two, made up of extensions in the wall of the joint projecting in the opening 34 in the direction of the axis 20. Outside of the fixing of the joint 30 to the base 6, these stops or abutments 44 are inserted in the spaces between the cylindrical sectors 28. By butting up against these spaces towards the rotation of the joint in relation to the base 6 around the axis 20, the stops 44 facilitate the positioning of the joint, notably by directly placing the orifices 36 of the four tabs 32 in coincidence.

The joint comprises two elements 46 in metal, here in steel at the level of the tabs 32. Each element 46 has a round ring shape and is characterized by having one of the orifices 36 at its center. Each element 46 has a peripheral rib 48 radially projecting from its external edge. Each rib 48 is embedded in the plastic material of the sealing material of the joint. This material can be a plastic material or an elastomer. It is made up, here, of an alloy of copolymer butadiene styrene block (SBS) and polypropylene (PP). The elements 46 are thus made up of inserts partially embedded in the plastic material molded of this material. The sealing material of the joint allows the reduction of the noise of the gear motor 2. The sealing material advantageously has a life of 43 shores D.

Each element 46 has two flat faces coming into surface contact with respectively the face of the edge 14 of the core 4 and the face of the edge 24 of the base 6, thus forming a straight stop for the relative positioning, following the axis 20, of the base 6 and the core 4, and assuring, in addition, the electric current between the base 6 and core 4. Each element 46 has a thickness e less than the thickness f of the wall in plastic material of the joint 30 in anticipation of the crushing of this material during the tightening of the joint between the base 6 and the core 4 for the sealing of the gear motor 2 to water and air.

During the fabrication of the gear motor, one first fits the joint 30 to the core 4 via lugs 40 making up the temporary fixation means. One can then manipulate, store or transport the core and the joint as one piece. One then returns the base 6 in order to interpose the joint between the base and the core. One fixes these three elements by screwing screws 50 crossing the tabs 26 of the core and of the joint and taken with the tabs 26 of the base. The screws 50 make up the definitive fixation means. One will note that the lugs 40 can reside snapped onto the core on the gear motor in its final state.

The joint 30 has, in its wall, orifices 52 at the base of the respective lugs 40 in order to allow the introduction of a screwing tool to remove each lug from the core if the separation from the joint and from the core is necessary at one moment or another.

One can put in place the characteristics relative to the temporary fixation of the joint 30 to one of the core and the base and/or the stops 44, independent of the presence of the metallic elements 46 in the joint.

What is claimed is:

1. A motor vehicle wiper gear motor comprising:

a core motor attached to a reduction gear base, the core and base having metal mating flanges with outer peripheries protruding away from the core and the base, respectively; and a joint interposed between the core and the base, the joint being diamond-shaped with lugs, the joint having a circular opening at its center, the joint including a sealing material means for reducing the gear motor noise and at least one metal element as a stop means for precise positioning of the core and the base, the core and the base, the at least one metal element operable to conduct electrical current between the core and the base to maintain a uniform electric potential in the core and the base.

2. The gear motor according to claim 1 further comprising:

a fixation orifice adjoining the metal element.

3. The gear motor according to claim 1, wherein the metal is embedded in the sealing material.

4. The gear motor according to claim 1 further comprising:

two metal elements, being disjointed from one another.

5. A motor vehicle wiper gear motor comprising:

a core motor attached to a reduction gear base, the core and base having metal mating flanges with outer peripheries protruding away from the core and the base respectively;

a diamond shaped joint interposed between the core and the base, the diamond shaped joint including a sealing material means for reducing the gear motor noise and at least one metal element as a stop means for precise positioning of the core and the base, in contact with metal parts of the core and the base; and definitive fixation means for the diamond shaped joint to the core motor and temporary fixation means for the diamond shaped joint to one of the core and the base, the temporary fixation means includes a wall extending substantially orthogonally from an edge of the diamond shaped joint and externally surrounds the outer periphery of the mating flange of the core when the diamond shaped joint and the core are assembled together.

6. The gear motor according to claim 5, wherein the temporary fixation means includes at least one clipping lug connected to one of the wall and on the diamond shaped joint, the at least one clipping lug formed as a substantially J-shaped element for snap fitting around the outer periphery of the mating flange on the core.

7. The gear motor according to claim 6 further comprising:

an access orifice in the lug to provide means for removing the temporary fixation means.

8. The gear motor according to claim 2 further comprising:

cooperating fixation means of the diamond shaped joint to the core motor and stop means for angular positioning of the diamond shaped joint in relation to the core motor around an axis of the core motor.

9. The gear motor according to claim 1, wherein one of the core and the base have at least one cylindrical sector, the diamond shaped joint having an opening able to receive the cylindrical sector and at least one stop projecting into the opening.

10. The gear motor according to claim 1, wherein the diamond shaped joint sealing material comprises a plastic material.

11. A manufacturing process of a gear motor comprising the steps of:

connecting a diamond shaped joint including a sealing material means for reducing the gear motor noise, to one of a core and a base by temporary fixation means;

positioning the diamond shaped joint between the core and the base; and fixing the diamond shaped joint, the core, and the base by definitive fixation means, such that electrical current conducts between the core and the base through at least one metal element associated with the diamond shaped joint.

12. A motor vehicle wiper gear motor manufactured by the process according to claim 11 comprising:

a core motor attached to a reduction gear base, the core and base having metal mating flanges with outer peripheries protruding away from the core and the base, respectively; and a diamond shaped joint interposed between the core and the base, the diamond shaped joint including at least one metal element as a stop means for precise positioning of the core and the base, in contact with metal parts of the core and the base, the at least one metal element operable to conduct electrical current between the core and the base.

* * * * *